No. 837,235. PATENTED NOV. 27, 1906.
J. T. LOWE.
WHEEL BLOCK.
APPLICATION FILED FEB. 15, 1906.

Witnesses
T. L. Mockabee
James F. Crown

Inventor
James T. Lowe

By Perford M. Smith
Attorney

UNITED STATES PATENT OFFICE.

JAMES T. LOWE, OF WASHINGTON, DISTRICT OF COLUMBIA, ASSIGNOR TO CHARLES F. FLEMMING, OF WASHINGTON, DISTRICT OF COLUMBIA.

WHEEL-BLOCK.

No. 837,235.      Specification of Letters Patent.      Patented Nov. 27, 1906.

Application filed February 15, 1906. Serial No. 301,244.

*To all whom it may concern:*

Be it known that I, JAMES T. LOWE, a citizen of the United States, residing at Washington, District of Columbia, have invented a certain new and useful Wheel-Block, of which the following is a specification, reference being had therein to the accompanying drawings.

This invention relates to wheel-blocks, the object of the invention being to provide a device in the nature of a wheel block or chock especially designed for the needs of automobile owners and constructed with reference to blocking up an automobile or vehicle in a car for transporting the machine from place to place, the block hereinafter particularly described being adapted to be secured to the floor of a car and having provision whereby the wheels of the automobile or other machine or vehicle may be securely anchored or fastened to the blocks, thus rendering it impossible for the machine to get loose and become injured by contact with other freight or the sides of the car.

With the above and other objects in view the invention consists in the novel construction, combination, and arrangement hereinafter fully described, illustrated, and claimed.

Figure 1:
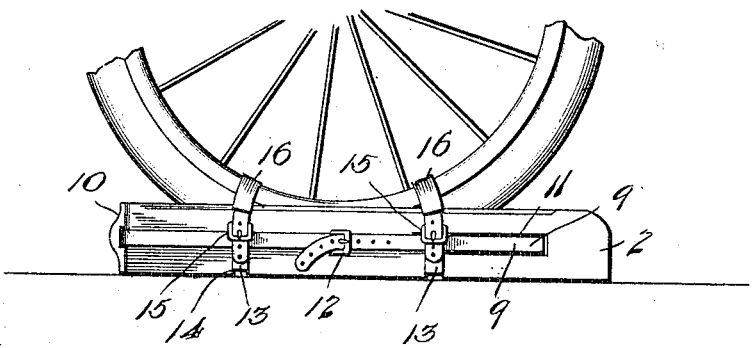
Figure 2:
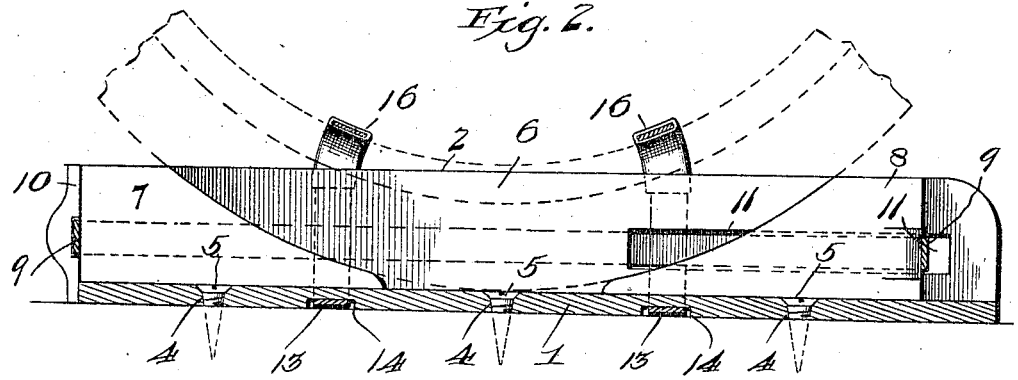
Figure 3:
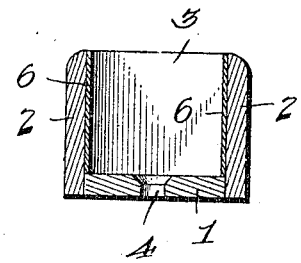

In the accompanying drawings, Figure 1 is a side elevation of a single blocking device embodying the present invention and illustrating a wheel secured therein. Fig. 2 is an enlarged vertical longitudinal section through the device. Fig. 3 is a vertical cross-section through the same.

The block contemplated in this invention comprises a wheel-holder of suitable length and width comprising a bottom 1, oppositely-arranged sides 2, and one end 3, connecting the sides 2. The distance between the sides 2 is approximately equal to the width of the rim and tire of the wheel of an automobile or other vehicles, so that such rim and wheel will fit snugly between the sides 2 when placed in the holder in the manner shown in Figs. 1 and 2, it being understood that one of said holders is employed for each wheel.

In order to secure the holder to the floor of a car or other support, the bottom 1 is provided at intervals with holes 4, adapted to receive fasteners 5, which are shown as consisting of ordinary wood-screws which are inserted through the holes 4 from above and driven downward into the car-floor, the heads of the screws being countersunk in the bottom 1. The sides 2 are preferably lined upon their inner surfaces, as shown at 6, with carpet, felt, or other material which will form a soft cushion for the wheel and prevent chafing the rim or felly thereof.

In the closed end of the holder there is arranged a wedge-shaped block 7 in connection with which a sliding and adjustable wedge-shaped block 8 is employed, and in order to move the block 8 toward the block 7 use is made of a drawing-strap 9, which passes through a combined strap-guide and retainer 10, secured to the end of the holder, and also through slots 11, formed in the sides 2 and extending lengthwise thereof, as shown in Figs. 1 and 2. The drawing-strap 9 is provided with a buckle 12 for holding the ends of the strap when drawn taut. After the block 8 has been advanced toward the block 7, so as to cause the wheel to rest in contact with both of said blocks and the ends of the strap have been secured by the buckle 12 to prevent backward movement of the block 8, the wheel is anchored to and within the holder by means of one or more anchor-straps 13, each of which extends transversely across the lower surface of the bottom 1 of the holder, the arrangement being such that the anchor-straps 13 may be inserted through the ways 14 after the holder has been fastened to the floor.

Each of the anchor-straps 13 is provided with an adjusting-buckle 15, so that it may be drawn taut around the felly and the holder, and in order to prevent marring the finish of the felly each of the straps 13 is provided with a soft sheathing or cushion 16, of carpet or other textile material, such sheathing being shown in the form of a sleeve extending entirely around the strap 13 and being of sufficient length to prevent any part of the strap chafing against the felly.

It is proposed to manufacture and sell the blocks herein described in sets of four, so that an automobile or any four-wheeled vehicle may be securely blocked up and anchored in a car for transportation. When not in use, the blocks may be readily carried under the seat of the automobile or other vehicle, where they will be readily accessible when wanted. The invention does away with the expense of blocking up an automobile or like vehicle with primitive devices each time the machine is loaded onto a car, and said blocks constitute a secure and reliable anchorage for the machine and also prevent abrading or otherwise injuring the machine or marring the finish thereof.

I claim—

1. A blocking-up device for vehicle-wheels comprising a base or bottom, a stationary block thereon, a movable block thereon, and a draw and stay strap for advancing the movable block toward the stationary block and holding the adjustment of the movable block.

2. A blocking-up device for vehicle-wheels comprising a base or bottom, a stationary block, a movable block, means for advancing the movable block toward the stationary block and holding the same, and anchor-straps connected with the base and adapted to pass over and across the wheel-felly.

3. A blocking-up device for vehicle-wheels comprising a base having transverse ways, sides extending upward from the base and provided with longitudinal slots, a stationary block, a movable block working between the sides, a draw and stay strap extending around the blocks and passing through the slots in the sides and anchor-straps passing through the transverse ways and adapted to pass across and over the wheel-felly substantially as described.

4. A blocking-up device for vehicle-wheels comprising a holder, means for securing said holder to the support on which it rests, a stationary block, a movable block, means for drawing the movable block toward the stationary block and holding the same, and means for anchoring a wheel to the holder.

5. A blocking-up device for vehicle-wheels comprising a base or bottom, sides extending upward therefrom, and provided with cushions or a lining upon their inner surfaces, a stationary block, an adjustable block movable between the sides, a draw and stay strap embracing both blocks and an anchor-strap adapted to extend transversely around the holder and felly, and carrying with it a protective sleeve or cushion substantially as described.

In testimony whereof I affix my signature in presence of two witnesses.

JAMES T. LOWE.

Witnesses
REXFORD M. SMITH,
E. H. PARKINS.